US010337424B2

(12) United States Patent
Janik

(10) Patent No.: US 10,337,424 B2
(45) Date of Patent: Jul. 2, 2019

(54) SYSTEM AND METHOD FOR ENERGY MANAGEMENT USING LINEAR PROGRAMMING

(71) Applicant: ELECTRONIC POWER DESIGN, Houston, TX (US)

(72) Inventor: John Bradford Janik, Houston, TX (US)

(73) Assignee: Electronic Power Design, Inc., Houston, TX (US)

( * ) Notice: Subject to any disclaimer, the term of this patent is extended or adjusted under 35 U.S.C. 154(b) by 333 days.

(21) Appl. No.: 15/415,797

(22) Filed: Jan. 25, 2017

(65) Prior Publication Data
US 2017/0234250 A1    Aug. 17, 2017

Related U.S. Application Data

(63) Continuation-in-part of application No. 14/558,489, filed on Dec. 2, 2014, now Pat. No. 9,365,265.

(60) Provisional application No. 62/297,636, filed on Feb. 19, 2016, provisional application No. 62/286,705, filed on Jan. 25, 2016.

(51) Int. Cl.
| | |
|---|---|
| *B60W 30/00* | (2006.01) |
| *F02D 41/00* | (2006.01) |
| *F02D 41/26* | (2006.01) |
| *G05B 15/02* | (2006.01) |
| *B63B 21/50* | (2006.01) |
| *E21B 41/00* | (2006.01) |
| *B63J 99/00* | (2009.01) |

(52) U.S. Cl.
CPC .......... *F02D 41/0027* (2013.01); *B63B 21/50* (2013.01); *F02D 41/26* (2013.01); *G05B 15/02* (2013.01); *B63B 2021/505* (2013.01); *B63J 2099/006* (2013.01); *E21B 41/0085* (2013.01); *F02D 2200/1002* (2013.01)

(58) Field of Classification Search
None
See application file for complete search history.

(56) References Cited

U.S. PATENT DOCUMENTS

| | | | | |
|---|---|---|---|---|
| 3,102,434 A | * | 9/1963 | Cramer, Jr. ............... | B66D 1/24 254/267 |
| 4,475,163 A | * | 10/1984 | Chandler ............... | B66D 1/505 377/17 |

(Continued)

*Primary Examiner* — Jonathan M Dager
(74) *Attorney, Agent, or Firm* — G. Michael Roebuck, PC

(57) ABSTRACT

A system is disclosed including but not limited to a processor; a hybrid power source for servicing a system load, the hybrid power source comprising a natural gas engine, a diesel engine and a battery; a linear computer program comprising, instructions determining a current system load serviced by power provided from the hybrid power source; instructions to determine a current operating state for the natural gas engine, the diesel engine and the battery; instructions to use linear programming to determine a new operating state for the natural gas engine, the diesel engine and the battery to reduce for power consumption servicing the current system load the natural gas engine, the diesel engine and the battery; and instructions to replace the current operating state for the natural gas engine, the diesel engine and the battery to the new operating state for the natural gas engine, the diesel engine and the battery.

20 Claims, 1 Drawing Sheet

(56) References Cited

U.S. PATENT DOCUMENTS

| | | | | |
|---|---|---|---|---|
| 4,476,801 A * | 10/1984 | Foster | | B63B 21/50 |
| | | | | 114/230.23 |
| 4,755,947 A * | 7/1988 | Braschler | | G05D 1/0208 |
| | | | | 405/158 |
| 5,803,008 A * | 9/1998 | Georgens | | B63B 21/04 |
| | | | | 114/293 |
| 6,374,765 B1 * | 4/2002 | Marotta | | B63B 21/22 |
| | | | | 114/293 |
| 6,595,493 B2 * | 7/2003 | Krebs | | B66C 13/44 |
| | | | | 254/266 |
| 7,263,946 B2 * | 9/2007 | Worthy | | B63B 21/20 |
| | | | | 114/293 |
| 7,520,490 B1 * | 4/2009 | Lee | | B66D 1/72 |
| | | | | 254/358 |
| 2003/0107030 A1 * | 6/2003 | Sozzi | | B66D 1/12 |
| | | | | 254/362 |
| 2011/0074165 A1 * | 3/2011 | Grimes | | E21B 3/02 |
| | | | | 290/40 C |
| 2013/0175878 A1 * | 7/2013 | Janik | | H02J 3/1842 |
| | | | | 307/105 |
| 2013/0241444 A1 * | 9/2013 | Fotherby | | H02M 7/48 |
| | | | | 318/51 |
| 2013/0307444 A1 * | 11/2013 | Settemsdal | | B60L 7/14 |
| | | | | 318/139 |
| 2013/0313894 A1 * | 11/2013 | Settemsdal | | H02J 4/00 |
| | | | | 307/9.1 |
| 2014/0197768 A1 * | 7/2014 | Haugen | | H02J 4/00 |
| | | | | 318/442 |
| 2014/0239871 A1 * | 8/2014 | Savva | | B66D 1/12 |
| | | | | 318/504 |
| 2015/0239546 A1 * | 8/2015 | Limseth | | B63H 23/24 |
| | | | | 440/6 |
| 2016/0009530 A1 * | 1/2016 | Teruzzi | | B66C 13/12 |
| | | | | 191/12.2 R |
| 2016/0114862 A1 * | 4/2016 | Janik | | B63B 21/50 |
| | | | | 701/21 |
| 2016/0159625 A1 * | 6/2016 | Janik | | B66D 1/485 |
| | | | | 701/21 |
| 2016/0207404 A1 * | 7/2016 | Melz | | B60K 6/24 |
| 2017/0211251 A1 * | 7/2017 | Janik | | E02B 17/0818 |
| 2017/0302075 A1 * | 10/2017 | Janik | | E21B 41/00 |
| 2017/0302218 A1 * | 10/2017 | Janik | | B63J 3/00 |
| 2018/0334177 A1 * | 11/2018 | Myers | | B61C 7/04 |

* cited by examiner

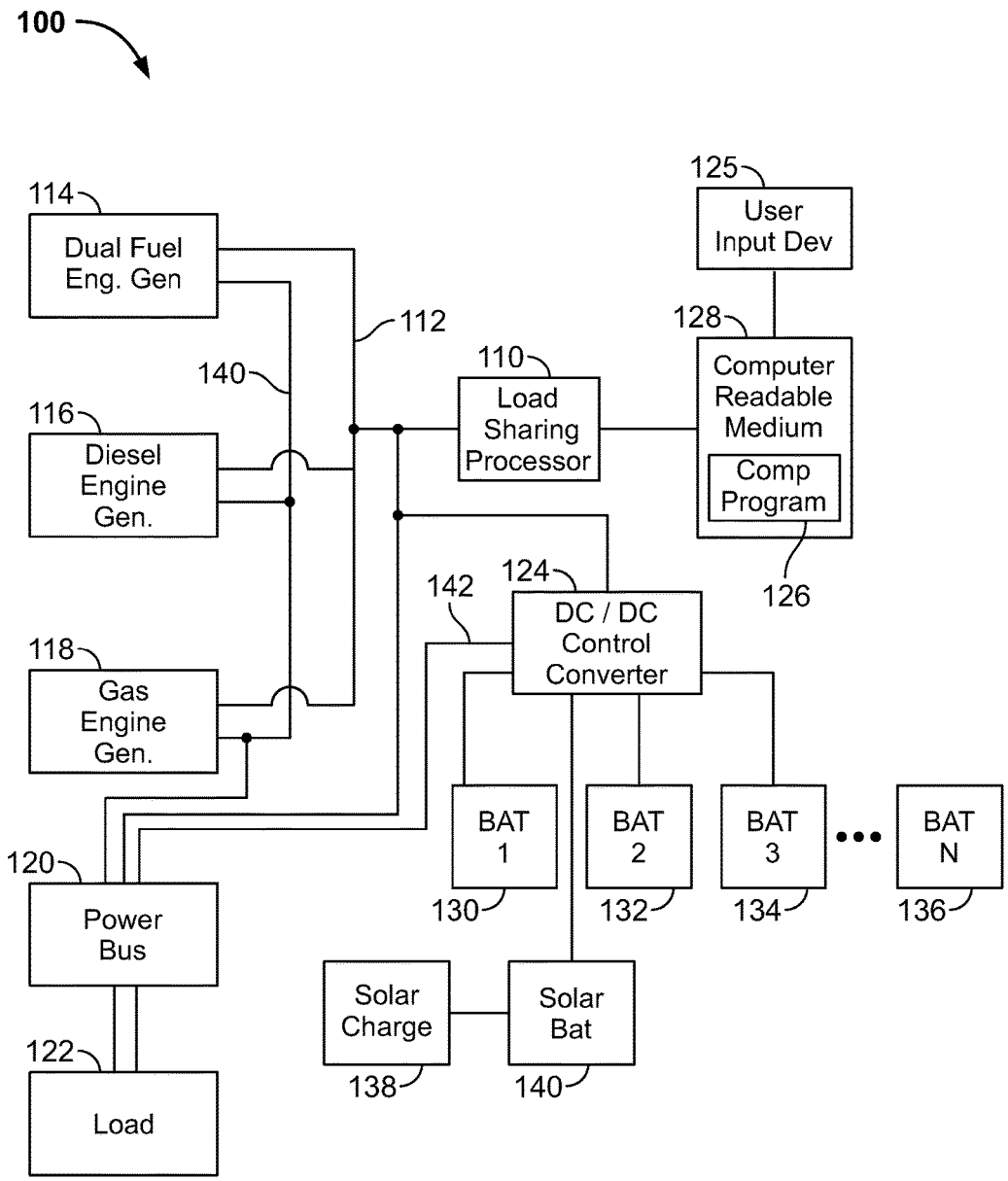

SYSTEM AND METHOD FOR ENERGY MANAGEMENT USING LINEAR PROGRAMMING

CROSS REFERENCE TO RELATED APPLICATIONS

This patent application claims priority from U.S. Provisional Patent Application No. 62/286,705 by John B. Janik, entitled "System and Method for Energy Management Using Linear Programming", filed on Jan. 25, 2016, and claims priority from U.S. patent application Ser. No. 14/558,489 filed on Dec. 2, 2014, now U.S. Pat. No. 9,365,265 by John B. Janik, issued on May 25, 2016 and entitled "Hybrid Winch with Controlled Release and Torque Impulse Generation" and claims priority from U.S. Provisional Patent Application No. 62/297,636 filed on Feb. 19, 2016 by John B. Janik entitled SYSTEM AND METHOD FOR HYBRID POWER GENERATION, all three of which are hereby incorporated by reference herein in their entirety.

BACKGROUND OF THE INVENTION

The use of natural gas engines as a power source has become popular in recent years. There is a problem in using the natural gas engine efficiently in a drilling environment where diesel engines are already in use.

FIELD OF THE INVENTION

The field of the invention is hybrid power sources and in particular the efficient use of hybrid power sources.

SUMMARY OF THE INVENTION

A Hybrid Power Generation System is disclosed proving a Load Sharing Processor the monitors and controls Dual Fuel Generators, Gas Generators and DC power batteries to provide hybrid power generation capacity to dynamically and efficiently provide power to handle high instantaneous torque requirements and long duty cycle ongoing power requirements. A method is disclosed for using the Hybrid Power Generation System.

BRIEF DESCRIPTION OF THE DRAWINGS

The invention will be better understood in reference to the following drawings, which are examples of an illustrative embodiment and are not limiting as different embodiments of the invention may be realized.

FIG. 1 is a schematic depiction of an illustrative embodiment of the invention showing a system for using linear programming for energy management.

In one particular illustrative embodiment of the invention a system is disclosed including but not limited to a processor; a hybrid power source for servicing a system load, the hybrid power source including but not limited to a natural gas engine and a diesel engine; a computer program comprising, instructions determining a current system load serviced by power provided from the hybrid power source; instructions to determine a current operating state for the natural gas engine, the diesel engine and the battery; instructions to use linear programming to determine an more efficient operating state for the natural gas engine, the diesel engine and the battery to reduce for power consumption servicing the current system load the natural gas engine, the diesel engine and the battery; and instructions to replace the current operating state for the natural gas engine, the diesel engine and the battery with the more efficient operating state for the natural gas engine, the diesel engine and the battery. A method is disclosed for using the system. In another illustrative embodiment of the invention, several types of stored energy DC power source batteries are added to the hybrid power generation system as another energy source to be used to provide energy.

The present invention provides a controller having a "Linear Algebra" (also referred to as herein as "Linear" and "Linear Programming") computer program stored in a non-transitory computer readable medium, wherein the Linear Algebra, or the solutions to simultaneous non-equalities, to yield substantially improved efficiency and substantially least efficiency solutions to active Energy Management. In an illustrative embodiment of the invention a system and method provides a substantially most efficient use of Solar power, the charging of stored energy devices, the discharging of stored energy devices, engine generator power, utility power and total and partial energy consumption and management.

In a particular illustrative embodiment, a controller having a linear programming computer program is provided for controlling the combined use of natural gas engines, diesel/natural gas duel fuel engines and battery power stored in a battery for energy for management in supplying energy to a system load being serviced by a combination of the natural gas engines, the diesel/natural gas duel fuel and the battery power. The linear programming computer program determines a current system load being serviced by the natural gas engines, diesel/natural gas duel fuel and battery power and determines a current load on each one of the natural gas engines, the diesel/natural gas duel fuel engine and the battery power. The linear programming system adjusts the usage of each of the natural gas engines, diesel/natural gas duel fuel engine and battery power for economically servicing the system load. The linear programming system adjusts the usage of each of the natural gas engines, diesel/natural gas duel fuel engine and battery power for reducing the power used for servicing the system load. A method is disclosed for using the linear programming energy management system.

A tutorial and description of the use of linear programming that can be adapted and used in one particular illustrative embodiment of the present invention is described in the book *Linear programming*, by Vasek Chvatal, W. H. Freeman and Company, New York, 1983. An example how to use of using linear programming to find an optimal fuel mixture for each generator at each time period and under each scenario using linear programming; and repeating the previous two steps as long as the fuel mixture obtained from the linear programming solution changes is shown in U.S. Pat. No. 6,021,402 to Takriti, which is hereby incorporated herein by reference in its entirety. An example of an energy management system that uses an expert system as an energy management system uses an expert engine and a numerical solver to determine an optimal manner of using and controlling the various energy consumption, producing and storage equipment in a plant/communities in order to for example reduce energy costs within the plant, and is especially applicable to plants that require or that are capable of using and/or producing different types of energy at different times. The energy management system operates the various energy manufacturing and energy usage components of the plant to minimize the cost of energy over time, or at various different times, while still meeting certain constraints or requirements within the operational system, such as producing a certain amount of heat or cooling, a certain power level, a certain level of production, etc. in U.S. Pat. No. 9,335,748 to Francino, which is hereby incorporated herein by reference in its entirety. In another particular illustrative embodiment of the invention, the Load Sharing Processor of the present invention is programmed as an expert system to perform energy management as described herein. In another particular illustrative embodiment of the invention, the Load Sharing Processor of the present invention is programmed as a neural network to perform energy management as described herein.

Systems and methods have been provided for combining natural gas generators and diesel fuel generators on the same electrical bus power land drill rigs. The good points of this arrangement is it enables a drilling contractor make use of very cheap locally produced natural gas to run the engine-generation needs for the drilling activities, thus greatly reducing expenses to operate a land drilling rig. The problem with this arrangement is that the natural gas generator has very poor speed response and cannot handle the high transient loads such as raising a draw works. To get even close to the high transient required response, the natural gas engine-generator is typically pre-loaded to 25-75% which consumes additional gas and wears out the gas generator out prematurely due to the continuous duty cycle.

In a particular illustrative embodiment of the invention, a system and method provide a solution by adding a battery to the system with ad DC-AC converter to allow fast transient response of the electrical system while solely operating with the natural gas engine-generator. On land based oil rigs, natural gas is relatively low cost and readily accessible as a by-product of operating the oil rig.

Dual fuel engines run on diesel and natural gas simultaneously. Using a dual fuel engine can reduce fuel cost per rig per month as it uses natural gas from the oil rig and when use in conjunction with the Hybrid Power Generation System disclosed herein is used intermittently as needed rather than being preload and continuously running, and thus has a lower duty cycle. Continuously running the natural gas engine during preload both wastes natural gas and shortens the life of the natural gas engine as it is worn out from running all the time during preload.

FIG. 1 depicts a particular illustrative embodiment of the invention as a system provided using a computer program for energy management. The computer program is a linear program. In another illustrative embodiment, the computer program can be but is not limited to a neural network and an expert system. Turning now to FIG. 1, in a particular illustrative embodiment of the invention, a dual fuel engine generator 114 is combined with a single gas engine 118, diesel engine 116 and a battery. In another illustrative embodiment the battery is not used. In another particular illustrative embodiment of the invention two diesel fuel engine generators are combined with a duel fuel engine generator and a battery. In another particular illustrative embodiment of the invention, all natural gas engine generators are provided and along with a battery. These illustrative embodiments of systems in the present invention are controlled by a processor using linear programming to achieve a high efficiency of use between the engine generators and the battery. In another embodiment a neural network is used to achieve a high efficiency of use between the engines and the battery. In another embodiment an expert system is used to achieve a high efficiency of use between the engine generators and the battery.

In the Hybrid Power Generation System, Dual Fuel Engine Generators (also referred to herein as "Dual Fuel Generators"), Gas Generators (also referred to herein as "Gas Engine Generators") and DC power batteries are provided to provide high power generation capacity to handle high instantaneous torque requirements and long duty cycle ongoing power requirements. In another embodiment the Gas Generator and DC power converter to Batteries 1-N are provided with a Dual Fuel Generator and with a Diesel Generator (also referred to as "Diesel Engine Generators"). A Load Sharing Processor is provided to handle load sharing between the Dual Fuel Generator 114 is combined with the Gas Generator 118, Diesel engine 116 the DC/DC Converter Controller 124 and DC power from Batteries 1-N. The Load Sharing Processor monitors power requirements from the Load 122 and efficiently shares the load between the Dual Fuel Generator 114, single gas engine 118, diesel engine generator 116 and the DC/DC Converter Controller 124 based on the load requirements and an efficient balance of power generation for the current load requirements based on linear programming in the Load Sharing Processor. The Load Sharing Processor provides substantially efficient use of the Dual Fuel Generator 114, single gas engine 118, diesel engine 116 and the batteries 130, 132, 134 and 136 attached to DC/DC Converter Controller 124 for handling base loads and loads requiring torque transients.

In a particular embodiment of the invention, the Load Sharing Processing uses Linear Programming stored as computer program 126 on computer readable medium 128 to read a current operating state for the Dual Fuel Generator 114, single gas engine 118, diesel engine 116 and the batteries 130, 132, 134 and 136 attached to DC/DC Converter Controller 124 and determines a substantially optimally efficient operating state for efficiently producing energy to service the load at the current time. The operating state for the Dual Fuel Generator and diesel generator includes but is not limited to engine revolutions per minute (RPM), variable frequency of a supply voltage, torque, plot point on a speed torque curve for the Dual Fuel Generator. The operating state for batteries includes but is not limited to percent charged to capacity, type of battery and plot point on a battery life to power output capacity curve for each battery type used in the system. The Load Sharing Processor achieves a substantially efficient load share by using a linear programming computer program stored on a computer readable medium to efficiently share the load of power generation to provide power a substantially reduced cost. In another embodiment of the invention, a battery is provided as another source to handle loads instantaneous torque requirements. In another embodiment of the invention, the battery is a solar power charged battery storage. In another embodiment of the invention, the batteries are provided to service high torque loads and the diesel engines are eliminated. In a particular illustrative embodiment, the oil rig is a land-based oil rig.

In another embodiment of the invention, a combination of gas engines, diesel engines and batteries are provided to handle loads. In another particular illustrative embodiment of the invention, a computer program is provided in a load management processor. The computer program includes but is not limited to computer instructions stored in a computer readable medium that when executed by the load management processor, perform functions that are useful in accomplishing efficient load sharing between the gas engines, diesel engines and battery when servicing loads on an oil rig. In another embodiment, the computer program includes but is not limited to instructions that use linear algebra to manage the load sharing.

In another particular illustrative embodiment of the invention, the computer program performs power management to efficiently provide power. In another particular illustrative embodiment of the invention, the computer program performs energy management. In the energy management embodiment, the computer program performs load balancing by managing energy supplied by multiple gas engines, variable frequency electric motors, variable voltage electric motors, various energy storage devices and multiple type hybrid batteries. A direct current (DC) to DC converter is provided between a bank of different type batteries to provide energy to the oil rig to efficiently handle loads during efficient load sharing between the multiple gas engines, variable frequency electric motors, variable voltage electric motors, various energy storage devices and multiple types of hybrid batteries.

In another embodiment of the invention, the load management processor executes the computer program to provide a linear algebra computer program to provide efficient load sharing and energy management to efficiently manage use of the different batteries and energy sources including but not limited to variable speed engines, multiple gas engines, variable frequency electric motors, variable voltage electric motors, various energy storage devices and multiple type hybrid batteries. In another embodiment of the invention, the load management processor executes the computer program to control the diesel engine in reference to an operating state for diesel engines including but not limited to a diesel engine fuel map, the fuel map including but not limited to a speed versus torque curve for the diesel engine to dynamically determine and control an efficient fuel-air mixture provided to the diesel engine generator to control the speed of the diesel engine generator to efficiently service a load. The speed versus torque curve is used by the load management processor to determine a speed to provide a particular torque based on the speed versus torque curve during efficient dynamic load management. In a particular illustrative embodiment of the invention, the diesel engine generator provides more torque at lower speeds.

In a particular illustrative embodiment, a 50 hertz or 60 hertz diesel engine generator is slowed down to increase torque provided by the diesel engine. For example, slowing down the diesel engine to 30 hertz increases the torque provided by the diesel engine at 60 hertz. A slowdown of the diesel engine to 30 hertz is accomplished by an alternating current (AC) to AC converter that is provided to synthesize 60 hertz to 30 hertz. In another embodiment the load management processor executes the computer program provides a nonlinear programming computer program to provide efficient load sharing and energy management. The Load Sharing Processor reads the speed and torque provided by the two diesel engine generators, the dual fuel engine generator and the four batteries connected to the DC/DC convert selects an substantially optimal frequency for each of the based on the speed versus torque curve for the two diesel engine generators, the dual fuel engine generator and a mix of using the batteries 130, 132, 134, 136 and solar battery 140 being charged by solar charger 138 to provide power to service the load 122.

In another embodiment, the Load Sharing Processor using an neural network to read the speed and torque provided by the two diesel engine generators, the dual fuel engine generator and the three batteries connected to the DC/DC convert selects an substantially optimal frequency for each of the based on the speed versus torque curve for the two diesel engine generators, the dual fuel engine generator and a mix of using the batteries 130, 132, 134, 136 and solar battery 140 being charged by solar charger 138 to provide power to service the load 122. In another embodiment, reads the speed and torque provided by the two diesel engine generators, the dual fuel engine generator and the three batteries connected to the DC/DC convert selects an substantially optimal frequency for each of the based on the speed versus torque curve for the two diesel engine generators, the dual fuel engine generator and a mix of using the batteries 130, 132, 134, 136 and solar battery 140 being charged by solar charger 138 to provide power to service the load 122.

Turning now to FIG. 1, FIG. 1 is a schematic block diagram a system in one particular illustrative embodiment of a Hybrid Power Generation System 100. As shown in FIG. 1, a Load Sharing Processor 110 sends control data and receives status data on communication bus 112 to and from a Dual Fuel Engine Generator 114, Diesel Engine 116, Gas Engine Generator 118, Power Bus 120, Load 122 and DC/DC Converter Controller 124. The DC/DC converter controller 124 sends control data to and receives status and request data from battery 1 130, battery 2 132 and battery 3 124, subsequent batteries N 136 and Solar Battery. In an illustrative embodiment battery 1 is a lithium manganese cobalt battery for large transient power requirements, battery 2 is a lithium titanate battery for long life and long duty cycle and battery 3 is a lead acid battery which provides raw power at a low cost.

A Power Bus 120 receives power from Dual Fuel Engine Generator 114, Diesel Engine 116, Gas Engine Generator 118 on a Generator Power Bus 140 and DC power from DC/DC Converter Controller 124 from Batteries 1 through N over Battery Power Bus 142.

A computer program 126 including but not limited to computer instructions stored in a Computer Readable Medium 128 are executed by the Load Sharing Processor 110. In a particular illustrative embodiment the Hybrid Power Generation System 100 Load Sharing Processor 110 controls the Hybrid Power Generation System to dynamically and efficiently provide power to meet load requirements for the Load 122.

In another particular illustrative embodiment, the Load Sharing Processor system generates a power impulse command to for example, provide a torque impulse to an equipment as described in U.S. Pat. No. 9,365,265 by John B. Janik, issued on May 25, 2016 and entitled "Hybrid Winch with Controlled Release and Torque Impulse Generation". In one particular embodiment, a torque profile is selected to apply a sharp rise in power provided by the Hybrid Power Generation System to generate a sharp rise in power supplied to and associated torque generated by an equipment such as a draw works, mud pump, drill, or a jack up rig gearbox motor as described in U.S. patent application Ser. No. 15/415,626 filed Jan. 25, 2017 by Janik and entitled "System and method for controlling a jack up rig" which is hereby incorporated by reference in its entirety and an anchor handling winch to rapidly increase power applied to the equipment and torque generated by the equipment. The stored battery backup power is applied to achieve a more rapid rise in energy supplied, available power generated and impulse torque exerted by the equipment than possible using the electric generator power by itself. In another particular embodiment, a torque profile is selected by the Load Sharing Processor to apply a sharp rise in torque on the winch to rapidly increase tension on the anchor cable to remove the anchor from the sea bed.

In another embodiment a user input from user input device 125 selecting a torque profile is received by the Load Sharing Processor. In another particular illustrative embodiment, a neural network is provided as a computer program in the computer readable medium that is executed by the Load Sharing Processor to monitor the operating states of the batteries, engines and generator discussed above and energy supplied to the equipment during operations of raising and lowering jack up rig legs and punch through testing and tension and torque applied to the anchor cable and winch during successful anchor setting operations. The neural network monitors the operating states for of all energy sources during the operations and stores them in the computer readable medium. The neural network stores the monitored operating states of the batteries, engines and generators discussed above and provided in the Hybrid Power Generation System which supplies to the equipment during raising and lowering jack up rig legs and punch through testing and tension and torque settings and applies the stored energy settings to the during raising and lowering jack up rig legs and punch through testing and tension and torque applies to the anchor cable and winch during successful anchor setting operations. In another particular illustrative embodiment, an expert system is provided as a computer program in the computer readable medium that is executed by the Load Sharing Processor to monitor energy supplied to the equipment during raising and lowering jack up rig legs and punch through testing and tension and torque applied during to the anchor cable and winch during successful anchor setting operations under changing acceptable stability parameters due to changes in loading of the vessel or damage to the vessel. The expert system stores the monitored tension and torque settings and applies the stored tension and torque settings to the winch during anchor handling operations.

In a particular illustrative embodiment a system is disclosed including but not limited to a processor in data communication with a non-transitory computer readable medium; a hybrid power source for servicing a system load, the hybrid power source comprising a natural gas engine, a diesel engine and a battery; a computer program comprising instructions stored in the non-transitory computer readable medium that are executed by the processor, the computer program comprising, instructions determining a current system load serviced by power provided from the hybrid power source; instructions to determine a current operating state for the natural gas engine, the diesel engine and the battery; instructions to use linear programming to determine a new operating state for the natural gas engine, the diesel engine and the battery to reduce power consumption servicing the current system load the natural gas engine, the diesel engine and the battery; and instructions to replace the current operating state for the natural gas engine, the diesel engine and the battery to the new operating state for the natural gas engine, the diesel engine and the battery. In another particular illustrative embodiment of the invention the operating state comprises a load on the diesel engine, speed of the diesel engine and air fuel mixture supplied to the diesel engine, wherein the operating state further comprises torque of the diesel engine. In another particular illustrative embodiment of the invention the operating state comprises a load on the natural gas engine, speed of the natural gas engine and air fuel mixture supplied to the natural gas engine, wherein the operating state further comprises torque of the natural gas engine. In another particular illustrative embodiment of the invention the operating state comprises a load on the battery. In another particular illustrative embodiment of the invention the computer program is a linear program. In another particular illustrative embodiment of the invention the computer program is an expert system. In another particular illustrative embodiment of the invention the computer program is a neural network.

In another particular illustrative embodiment of the invention a method is disclosed including but not limited to determining using a computer program a current system load serviced by power provided from a hybrid power source for servicing a system load, the hybrid power source comprising a natural gas engine, a diesel engine and a battery; determining a current operating state for the natural gas engine, the diesel engine and the battery; determining using linear programming to a new operating state for the natural gas engine, the diesel engine and the battery to reduce for power consumption servicing the current system load the natural gas engine, the diesel engine and the battery; and replacing the current operating state for the natural gas engine, the diesel engine and the battery to the new operating state for the natural gas engine, the diesel engine and the battery. In another particular illustrative embodiment of the invention the operating state comprises a load on the diesel engine, speed of the diesel engine and air fuel mixture supplied to the diesel engine, wherein the operating state further comprises torque of the diesel engine. In another particular illustrative embodiment of the invention the operating state comprises a load on the natural gas engine, speed of the natural gas engine and air fuel mixture supplied to the natural gas engine, wherein the operating state further comprises torque of the natural gas engine. In another particular illustrative embodiment of the invention the operating state comprises a load on the battery. In another particular illustrative embodiment of the invention the computer program is a linear program. In another particular illustrative embodiment of the invention the computer program is an expert system. In another particular illustrative embodiment of the invention the computer program is a neural network.

In another particular illustrative embodiment of the invention a computer readable medium is disclosed containing instructions that are executed a processor in data communication with a non-transitory computer readable medium to control a hybrid power source for servicing a system load, the hybrid power source comprising a natural gas engine, a diesel engine and a battery, the computer program comprising instructions stored in the non-transitory computer readable medium that are executed by the processor, the computer program including but not limited to instructions to cause the load processor to determine a current system load serviced by power provided from the hybrid power source; instructions for the processor to determine a current operating state for the natural gas engine, the diesel engine and the battery; instructions for the processor to use linear programming to determine a new operating state for the natural gas engine, the diesel engine and the battery to reduce power consumption servicing the current system load the natural gas engine, the diesel engine and the battery; and instructions for the processor to replace the current operating state for the natural gas engine, the diesel engine and the battery to the new operating state for the natural gas engine, the diesel engine and the battery.

In another particular illustrative embodiment of the invention in the computer readable medium, the operating state comprises a load on the diesel engine, speed of the diesel engine and air fuel mixture supplied to the diesel engine, wherein the operating state further comprises torque of the diesel engine. In another particular illustrative embodiment of the invention in the computer readable medium, the operating state comprises a load on the natural gas engine, speed of the natural gas engine and air fuel mixture supplied to the natural gas engine, wherein the operating state further comprises torque of the natural gas engine. In another particular illustrative embodiment of the invention in the computer readable medium, the operating state comprises a load on the battery. In another particular illustrative embodiment of the invention in the computer readable medium, the computer program is a linear program. In another particular illustrative embodiment of the invention in the computer readable medium, the computer program is an expert system.

The present invention can be realized in hardware, software, or a combination of hardware and software. In a specific embodiment, a system according to the present inventions can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general purpose computer system with a computer program that, when being loaded and executed, controls the computer system such that it carries out the methods and inventions described herein.

The figures herein include block diagram and flowchart illustrations of methods, apparatus(es) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of networks.

The term "executable" as used herein means that a program file is of the type that may be run by the Load Sharing Processor 110. In specific embodiments, examples of executable programs may include without limitation: a compiled program that can be translated into machine code in a format that can be loaded into a random access portion of the Computer Readable Medium 128 and run by the Load Sharing Processor 110; source code that may be expressed in proper format such as object code that is capable of being loaded into a random access portion of the Computer Readable Medium 128 and executed by the Load Sharing Processor 110; or source code that may be interpreted by another executable program to generate instructions in a random access portion of the Computer Readable Medium to be executed by the Load Sharing Processor 110. An executable program may be stored in any portion or component of the Computer Readable Medium including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The Computer Readable Medium may include both volatile and nonvolatile memory and data storage components. Volatile components are those that do not retain data values upon loss of power. Nonvolatile components are those that retain data upon a loss of power. Thus, the Computer Readable Medium may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the Load Sharing Processor may represent multiple Load Sharing Processors and/or multiple processor cores and the Computer Readable Medium may represent multiple Computer Readable Mediums that operate in parallel processing circuits, respectively. In such a case, the local interface may be an appropriate network that facilitates communication between any two of the multiple Processors, between any processor and any of the Computer Readable Medium, or between any two of the Computer Readable Mediums, etc. The local interface may comprise additional systems designed to coordinate this communication, including, for example, performing load balancing. The Load Sharing Processor may be of electrical or of some other available construction.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Flowcharts and Block Diagrams of FIG. 1 show the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a Load Sharing Processor in a computer system or other system. The machine code may be converted from the source code, etc. If embodied in hardware, each block may represent a circuit or a number of interconnected circuits to implement the specified logical function(s).

Although the flowchart and block diagram of FIG. 1 show a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. Further, in some embodiments, one or more of the blocks shown in FIG. 1 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions.

Any logic or application described herein that comprises software or code can be embodied in any non-transitory computer-readable medium, such as computer-readable medium, for use by or in connection with an instruction execution system such as, for example, a Load Sharing Processor in a computer system or other system. In this sense, the logic may comprise, for example, statements including instructions and declarations that can be fetched from the computer-readable medium and executed by the instruction execution system. In the context of the present inventions, a "computer-readable medium" may include any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The Load Sharing Processor may further include a network interface coupled to the bus and in communication with the network. The network interface may be configured to allow data to be exchanged between computer and other devices attached to the network or any other network or between nodes of any computer system or the video system. In addition to the above description of the network, it may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 159 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The Load Sharing Processor may also include an input/output interface coupled to the bus and also coupled to one or more input/output devices, such as a display, a touch-screen, a mouse or other cursor control device, and/or a keyboard. In certain specific embodiments, further examples of input/output devices may include one or more display terminals, keypads, touchpads, scanning devices, voice or optical recognition devices, or any other devices suitable for entering or accessing data by one or more computers. Multiple input/output devices may be present with respect to a computer or may be distributed on various nodes of computer system, the system and/or any of the viewing or other devices shown in FIG. 1. In some embodiments, similar input/output devices may be separate from the Load Sharing Processor and may interact with the Load Sharing Processor or one or more nodes of computer system through a wired or wireless connection, such as through the network interface.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

What is claimed is:
1. A system comprising:
 a processor in data communication with a non-transitory computer readable medium;
 a hybrid power source for servicing a system load, the hybrid power source comprising a natural gas engine, a diesel engine and a battery;

a computer program comprising instructions stored in the non-transitory computer readable medium that are executed by the processor, the computer program comprising, instructions determining a current system load serviced by power provided from the hybrid power source;

instructions to determine a current operating state for the natural gas engine, the diesel engine and the battery;

instructions to determine a new operating state for the natural gas engine, the diesel engine and the battery to reduce power consumption servicing the current system load the natural gas engine, the diesel engine and the battery; and instructions to replace the current operating state for the natural gas engine, the diesel engine and the battery to the new operating state for the natural gas engine, the diesel engine and the battery.

2. The system of claim 1, wherein the operating state comprises a load on the diesel engine, speed of the diesel engine and air fuel mixture supplied to the diesel engine, wherein the operating state further comprises torque of the diesel engine.

3. The system of claim 1, wherein the operating state comprises a load on the natural gas engine, speed of the natural gas engine and air fuel mixture supplied to the natural gas engine, wherein the operating state further comprises torque of the natural gas engine.

4. The system of claim 1, wherein the operating state comprises a load on the battery.

5. The system of claim 1, wherein the computer program is a linear program.

6. The system of claim 1, wherein the computer program is an expert system.

7. The system of claim 1, wherein the computer program is a neural network.

8. A method comprising:

determining using a computer program a current system load serviced by power provided from a hybrid power source for servicing a system load, the hybrid power source comprising a natural gas engine, a diesel engine and a battery;

determining a current operating state for the natural gas engine, the diesel engine and the battery;

determining a new operating state for the natural gas engine, the diesel engine and the battery to reduce power consumption servicing the current system load the natural gas engine, the diesel engine and the battery; and replacing the current operating state for the natural gas engine, the diesel engine and the battery to the new operating state for the natural gas engine, the diesel engine and the battery.

9. The method of claim 8, wherein the operating state comprises a load on the diesel engine, speed of the diesel engine and air fuel mixture supplied to the diesel engine, wherein the operating state further comprises torque of the diesel engine.

10. The method of claim 8, wherein the operating state comprises a load on the natural gas engine, speed of the natural gas engine and air fuel mixture supplied to the natural gas engine, wherein the operating state further comprises torque of the natural gas engine.

11. The method of claim 8, wherein the operating state comprises a load on the battery.

12. The method of claim 8, wherein the computer program is a linear program.

13. The method of claim 8, wherein the computer program is an expert system.

14. The method of claim 8, wherein the computer program is a neural network.

15. A computer readable medium contain instructions that are executed a processor in data communication with a non-transitory computer readable medium to control a hybrid power source for servicing a system load, the hybrid power source comprising a natural gas engine, a diesel engine and a battery, the computer program comprising instructions stored in the non-transitory computer readable medium that are executed by the processor, the computer program comprising, instructions to cause the load processor to determine a current system load serviced by power provided from the hybrid power source; instructions for the processor to determine a current operating state for the natural gas engine, the diesel engine and the battery;

instructions for the processor to determine a new operating state for the natural gas engine, the diesel engine and the battery to reduce power consumption servicing the current system load the natural gas engine, the diesel engine and the battery; and instructions for the processor to replace the current operating state for the natural gas engine, the diesel engine and the battery to the new operating state for the natural gas engine, the diesel engine and the battery.

16. The medium of claim 15, wherein the operating state comprises a load on the diesel engine, speed of the diesel engine and air fuel mixture supplied to the diesel engine, wherein the operating state further comprises torque of the diesel engine.

17. The medium of claim 15, wherein the operating state comprises a load on the natural gas engine, speed of the natural gas engine and air fuel mixture supplied to the natural gas engine, wherein the operating state further comprises torque of the natural gas engine.

18. The medium of claim 15, wherein the operating state comprises a load on the battery.

19. The medium of claim 15, wherein the computer program is a linear program.

20. The medium of claim 15, wherein the computer program is an expert system.

* * * * *